United States Patent
Qarni et al.

(10) Patent No.: US 6,438,105 B1
(45) Date of Patent: Aug. 20, 2002

(54) RELIABLE INTERNET FACSIMILE PROTOCOL

(75) Inventors: Khwaja F. Qarni, Mt. Prospect; Ashish A. Sardesai, Schaumburg, both of IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/247,118

(22) Filed: Feb. 8, 1999

(51) Int. Cl.[7] .............................. H04L 1/08; H04B 3/06
(52) U.S. Cl. ...................... 370/231; 370/235; 358/425; 714/749
(58) Field of Search ................................ 370/229, 235, 370/236, 282, 384, 394, 395.52; 714/748, 749; 358/425, 442

(56) References Cited

U.S. PATENT DOCUMENTS

| 5,528,595 | A |   | 6/1996 | Walsh et al. | |
| 5,739,919 | A | * | 4/1998 | Lee et al. | 358/407 |
| 6,046,980 | A | * | 4/2000 | Packer | 370/230 |
| 6,115,357 | A | * | 11/2000 | Packer et al. | 370/231 |
| 6,018,530 | A1 | * | 1/2001 | Chakravorty | 370/471 |
| 6,233,224 | B1 | * | 5/2001 | Yamashita et al. | 370/231 |
| 6,249,530 | B1 | * | 6/2001 | Blanco et al. | 370/468 |
| 6,256,115 | B1 | * | 7/2001 | Adler et al. | 358/442 |
| 6,320,846 | B1 | * | 11/2001 | Jamp et al. | 370/235 |

OTHER PUBLICATIONS

Douglas E. Comer, Internetworking with TCP/IP, vol. 1, Principles, Protocols and Architecture, Chapter 13, Prentis–Hall (1995).
International Telecommunications Union–Telephony (ITU–T), H.323, "Packet based multimedia communcations systems", (1998).
International Telecommunications Union–Telephony (ITU–T), T.38, "Procedures for Real Time Group 3 Facsimile Communication Over IP Networks", standard draft documentation (Jun., 1998).
International Telecommunications Union–Telephony (ITU–T), H.225.0, Version 2, "Call Signaling Protocols and Media Stream Packetization for Packet Based Multimedia Communication Systems", standard draft documentation (Mar. 25, 1997).

* cited by examiner

Primary Examiner—Hassan Kizou
Assistant Examiner—David Odland
(74) Attorney, Agent, or Firm—McDonnell Boehnen Hulbert & Berghoff (57) ABSTRACT

A reliable facsimile transmission protocol and method for transmission of facsimile data over an IP network such as the Internet. The protocol features error correction through the use of a retransmission of packets with a flow-control window and a dynamic redundancy window which alters the number of redundant frames that are transmitted in the packet. The size of the dynamic redundancy window expands or contracts depending on the behavior and quality of the IP network, for example whether it exhibits choppy, error-causing characteristics.

12 Claims, 5 Drawing Sheets

| FORMAT | DESCRIPTION | ENCODING | | | | | | | LSB |
|---|---|---|---|---|---|---|---|---|---|
| DATA | V.21 HDLC DATA | 0 | 0 | 0 | 0 | 0 | 0 | 0 | 0 |
| | V.27ter @ 2400 | 0 | 0 | 0 | 0 | 0 | 0 | 1 | 0 |
| | V.27ter @ 4800 | 0 | 0 | 0 | 0 | 0 | 1 | 0 | 0 |
| | V.29 @ 7200 | 0 | 0 | 0 | 0 | 0 | 1 | 1 | 0 |
| | V.29 @ 9600 | 0 | 0 | 0 | 0 | 1 | 0 | 0 | 0 |
| | V.17 @ 7200 | 0 | 0 | 0 | 0 | 1 | 0 | 1 | 0 |
| | V.17 @ 9600 | 0 | 0 | 0 | 0 | 1 | 1 | 0 | 0 |
| | V.17 @ 12000 | 0 | 0 | 0 | 0 | 1 | 1 | 1 | 0 |
| | V.17 @ 14400 | 0 | 0 | 0 | 1 | 0 | 0 | 0 | 0 |
| | RESERVED | 0 | 0 | 0 | 1 | 0 | 0 | 1 | 0 |
| | RESERVED | 0 | 0 | 0 | 1 | 0 | 1 | 0 | 0 |
| | RESERVED | 0 | 0 | 0 | 1 | 0 | 1 | 1 | 0 |
| | RESERVED | 0 | 0 | 0 | 1 | 1 | 0 | 0 | 0 |
| | RESERVED | 0 | 0 | 0 | 1 | 1 | 0 | 1 | 0 |
| | RESERVED | 0 | 0 | 0 | 1 | 1 | 1 | 0 | 0 |
| | RESERVED | 0 | 0 | 0 | 1 | 1 | 1 | 1 | 0 |
| CONTROL | NO SIGNAL | 0 | 0 | 0 | 0 | 0 | 0 | 0 | 1 |
| | CNG | 0 | 0 | 0 | 0 | 0 | 0 | 1 | 1 |
| | CED | 0 | 0 | 0 | 0 | 0 | 1 | 0 | 1 |
| | V.21 PREAMBLE FLAGS | 0 | 0 | 0 | 0 | 0 | 1 | 1 | 1 |
| | V.27ter 2400 MOD TRAINING | 0 | 0 | 0 | 0 | 1 | 0 | 0 | 1 |
| | V.27ter 4800 MOD TRAINING | 0 | 0 | 0 | 0 | 1 | 0 | 1 | 1 |
| | V.29 7200 MOD TRAINING | 0 | 0 | 0 | 0 | 1 | 1 | 0 | 1 |
| | V.29 9600 MOD TRAINING | 0 | 0 | 0 | 0 | 1 | 1 | 1 | 1 |
| | V.17 7200 MOD SHORT TRAINING | 0 | 0 | 0 | 1 | 0 | 0 | 0 | 1 |
| | V.17 7200 MOD LONG TRAINING | 0 | 0 | 0 | 1 | 0 | 0 | 1 | 1 |
| | V.17 9600 MOD SHORT TRAINING | 0 | 0 | 0 | 1 | 0 | 1 | 0 | 1 |
| | V.17 9600 MOD LONG TRAINING | 0 | 0 | 0 | 1 | 0 | 1 | 1 | 1 |
| | V.17 12000 MOD SHORT TRAINING | 0 | 0 | 0 | 1 | 1 | 0 | 0 | 1 |
| | V.17 12000 MOD LONG TRAINING | 0 | 0 | 0 | 1 | 1 | 0 | 1 | 1 |
| | V.17 14400 MOD SHORT TRAINING | 0 | 0 | 0 | 1 | 1 | 1 | 0 | 1 |
| | V.17 14400 MOD LONG TRAINING | 0 | 0 | 0 | 1 | 1 | 1 | 1 | 1 |
| RESERVED | RESERVED | 0x20 TO 0xFF | | | | | | | |

RELIABLE INTERNET FACSIMILE PROTOCOL

BACKGROUND OF THE INVENTION

A. Field of the Invention

This invention relates to methods and protocols for transmission of facsimile data over Internet Protocol (IP) packet switched networks. More particularly, it relates to a new protocol (User Datagram Protocol Extension or "UDPX" herein) for transporting the data in a reliable and error-corrected fashion over the packet switched network between two gateways. The gateways provide an interface to the packet switched network and an interface to a telephone network and sending and receiving fax machines. The present invention provides for error correction through the use of selective retransmission of data packets, error correction through dynamic adjustment of flow control and redundant packet windows, and, optionally, additional error detection through frame check sequences (FCS) on facsimile data packets where the FCS bits are placed in every facsimile data packet.

B. Description of Related Art

The International Telecommunications Union-Telephony (ITU-T) is an international standards body that proposes and adopts certain standards relating to telecommunications. One such standard, ITU-T draft recommendation T.38, "Procedures for Real Time Group 3 Facsimile Communication between Terminals Using IP Networks", which is incorporated by reference herein, describes the technical features necessary to transfer facsimile documents between G3 terminals over IP networks. The recommendation also proposes an optional transport layer protocol based on the User Datagram Protocol (UDP) with a means for error control.

TCP is a connection-oriented protocol, with built in frame check sequences and timer-based retransmission schemes. For background information on these and other features of TCP, see, e.g., Douglas E. Comer, *Internetworking with TCP/IP, Vol. 1, Principles, Protocols and Architecture*, Chapter 13, Prentis-Hall (1995). Since facsimile transmission is delay sensitive, the delay characteristics and congestion problems associated with TCP make it unsuitable for fax transmission. Also, TCP attempts to share the available bandwidth fairly among competing TCP sessions, which is not suitable for fax which has fixed bit rate requirements.

UDP is a connectionless protocol with provision for optional frame check sequences and no retransmission schemes. ITU-T draft recommendation T.38 suggests implementing a reliable protocol (known as UDPTL) which is based on providing sequence numbers and either providing forward error correction or redundancy for fax packets which are sent over UDP. ITU-T draft recommendation T.38 also discusses an XOR-based forward error correction scheme and also discusses a redundancy scheme which is used to assemble an additional number of prior fax packets, after the primary packet, with monotonically decreasing sequence numbers. To maintain the real-time characteristics of fax transmission, the UDP approached described above is more suitable as compared to the TCP approach described in the previous paragraph.

However, to implement the UDP approach as defined by the T.38 recommendation, the error control protocol UDPTL needs to be supported. The UDPTL protocol allows for either forward error correction or redundant transmission of fax packets. There are several disadvantages to this protocol. First of all, the forward error correction schemes, when implemented in UDPTL, may not be able to recover from choppy behavior of the IP network being used (e.g., loss of packets) and may result in excessive loss of packets. Not only would this result in loss of fax data packets, it would lead to additional buffer requirements on the transmitting end and require additional bit computations. Secondly, with the redundancy scheme as proposed in the T.38 recommendation, UDPTL would have to maintain a constant overhead for all packets. This would mean additional bandwidth requirements as well as buffer requirements. Thirdly, with UDPTL the transmitter has no knowledge of valid reception of packets by the receiver. Consequently, an adaptive control mechanism cannot be implemented, which results in additional bandwidth requirements.

The present invention attempts to address these problems, and provide a new protocol and method for reliable transmission of facsimile data over an IP network. The method and protocol are designed to run on top of the UDP and IP protocols with a "light-weight", i.e., low overhead, acknowledgement and retransmission scheme that provides for adaptive control over transmission of facsimile data, using a sliding window to make the data transfer reliable, while maintaining real time characteristics.

These and other features of the invention will be more apparent from the following summary and detailed description of a preferred embodiment of the invention.

SUMMARY OF THE INVENTION

A method is provided for transmitting facsimile data across a packet-switched network from a transmitter to a receiver in a reliable fashion. The method comprises the steps of:

(a) implementing a sliding flow control window that controls the maximum outstanding frames that the transmitter may transmit at any given time without waiting for an acknowledgement from the receiver;

(b) implementing a dynamic redundancy window that controls the number of redundant packets that are retransmitted from the transmitter to the receiver within each of the frames; and (c) increasing or decreasing the size of the dynamic redundancy window depending on whether the network exhibits choppy behavior, such as a tendency to lose packets transmitted between the transmitter and the receiver.

The error correction functionality is achieved in the above method by transmitting sequentially numbered "information" frames, each containing a number of packets containing facsimile data. The maximum number of frames is given by the maximum permissible window size. When the receiver receives the numbered information frames, it keeps acknowledging the sequentially received information frames. The sliding flow control window then moves forward to enable the transmitter to send more information frames.

Within each information frame there may exist one or more redundant facsimile data packets. The number of redundant facsimile data packets is controlled by the dynamic redundancy window. When the network exhibits choppy behavior, the size of the redundancy window increases and more packets (with monotonically decreasing sequence numbers) are transmitted. If the network does not exhibit choppy behavior, then the dynamic redundancy window is reduced such that no redundant packets are transmitted.

In another aspect of the invention, an improvement to a transmitter or gateway for Internet Protocol (IP) facsimile is provided. The transmitter has an interface to a public switched telephone network (PSTN), with the PSTN interface receiving facsimile data from a fax machine connected to the PSTN. The transmitter has an interface to an IP packet switched network, such as the Internet or Internet Service Provider backbone network. The improvement comprises a transmission module controlling the transmission of facsimile data onto the IP network for receipt by a receiver for the facsimile data.

The transmission module, which may, for example be incorporated into the interface module providing the IP interface, implements a sliding flow control window that controls the maximum outstanding frames that the transmitter may transmit at any given time without waiting for an acknowledgement from the receiver. The transmission module implements a dynamic redundancy window that controls the number of redundant packets that are retransmitted from the transmitter to the receiver. The transmission module increases or decreases the size of the dynamic redundancy window depending on whether the network exhibits a tendency to lose packets transmitted between the transmitter and the receiver.

These and other features of the invention will be described in further detail in the following detailed description of a presently preferred embodiment.

BRIEF DESCRIPTION OF THE DRAWINGS

In the following description, reference will be made to the appended drawings, where like reference numerals refer to like elements in the various figures, and wherein.

DETAILED DESCRIPTION OF THE PREFERRED AND ALTERNATIVE EMBODIMENTS OF THE INVENTION

Figure 1:
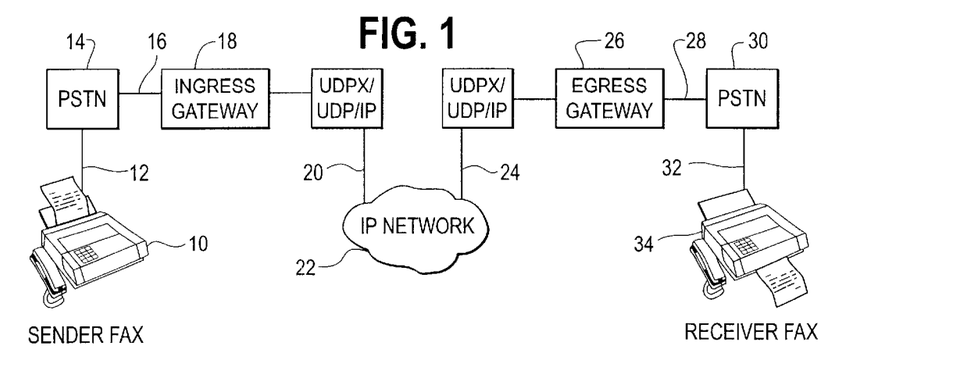
FIG. 1 is diagram illustrating a model for facsimile transmission over an IP network between ingress and egress gateways or network access servers, with each of the ingress and egress gateways providing an interface to the public switched telephone network and to the IP network.

Referring now to the appended drawing figures, FIG. 1 is diagram illustrating a model or system for providing transmission of facsimile data over an IP network. The source of the facsimile data is a sending fax machine 10 which is connected to a telephone line 12 to a telephone network, such as the Public Switched Telephone Network (PSTN), cellular telephone network, or other type of network such as a wireless personal communications network. The PSTN 14 includes a central office (not shown) where switching equipment multiplexes the data onto a high speed digital telephone line 16 and supply the fax data signals to a network access server 18 forming an ingress gateway to an IP packet witched network 20, such as a local area network.

The network access server 18 may be configured to accommodate facsimile data, voice, multimedia or other types of data. An example of a network access server suitable for functioning as ingress gateway 18 platform is the Total Control Enterprise Network Hub of 3Com Corporation, the assignee of the present invention. Further details can be found in U.S. Pat. No. 5,528,595 to Dale M. Walsh et al., which is incorporated by reference herein. Network access servers are also available from other companies in the industry, including Ascend Communications, Cisco Systems, Lucent Technologies, and others. The facsimile data on the network is in the form of packets or frames encapsulated in accordance with the IP, UDP and UDPX protocols, as indicated in the figure. The ingress gateway 18 includes a router module or card that includes known and commercially available IP and UDP protocol stacks (software modules) that perform the protocol processing necessary for the outgoing facsimile data. Further details on the functions of the UDPX protocol stack are described in further detail below.

In the example of FIG. 1, the network 20 is in turn coupled to a wide area IP network 22 such as the Internet, by a suitable router (not shown). The facsimile data passes through the IP network 22 in accordance with IP address fields in the IP header to another network 24 and to an egress gateway configured as another network access server 26. The egress gateway 26 may be of the same general type and construction as the ingress gateway 18. The egress gateway 26 performs the reverse processing of the protocols on the facsimile data arriving on network 24, multiplexes them onto a telephone line 28 where they are sent via the PSTN 30 and telephone line 32 to a receiving fax machine 34. ITU-T specification H.323 and H.225 describe further details regarding Internet telephony and locating the receiving or egress gateway 26. The ITU-T H.323 and H.225 Standard documents, presently in a draft form, are both hereby fully incorporate by reference herein.

The present invention relates to reliable transmission of the facsimile data over the IP network 22 (and over the intermediate IP network elements 20 and 24). The following description occasionally refers to a "transmitter" and a "receiver". These terms are used to describe the components of the ingress gateway 18 and the egress gateway 26, respectively, that are responsible for transmitting and receiving the facsimile data over the IP network 22 and processing the protocol described herein.

The PSTN, which was primarily intended for voice calls, has for a long time been used for facsimile transmission of documents. The cost of transmission over the PSTN is high, due to per-minute charges that are imposed by the local and/or long distance telephone companies. Conversely, the cost of long distance telephone call over the Internet (e.g., 22) can be a small fraction of the cost of the same call over the PSTN, since typically only local call rates will apply to the portions of the call along lines 12, 16, 28 and 32 of FIG. 1. Both the transitional telephone companies and the Internet Service Providers alike see the advantages in utilizing the efficiencies of IP/data-networking techniques to transport voice and fax data over high speed data networks. However, the telephone subscriber has come to expect a very high dependability and availability of services provided by the existing telecommunications network, and this expectation should ideally be carried over as new equipment, services and functionality (such as fax over the internet) are integrated into the existing telecommunications network.

The methods and procedures described herein specify the messages, data exchange, error correction and recovery between the ingress gateway 18 and the egress gateway 26 connected via an IP network 22. These features are optimized for sending faxes over a UDP-based IP network. Implementation of the invention provides reliability in the transmission of facsimile data, efficiency, and some optimal features for future expansion. Basically, the methods of the present invention work on top of the UDP and IP protocols.

Figure 2:
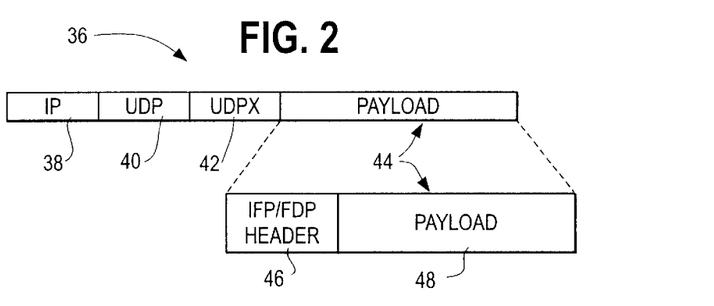
FIG. 2 is an illustration of the frame structure for an IP/UDP facsimile frame in accordance with the protocol and method of the present invention.
Figure 8:
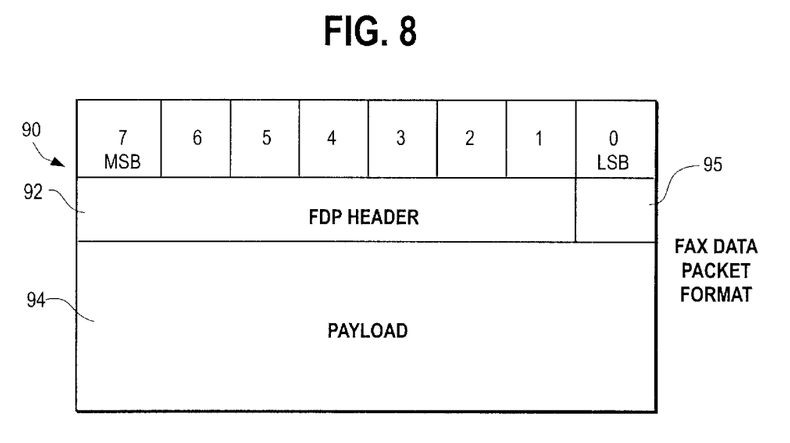
FIG. 8 is an illustration of the structure of a fax data packet, an optional form for a payload in accordance with the protocol of the present invention.

The call establishment between the ingress and egress gateways 18 and 26 are as described in the H.323 specification, and the reader is directed to that document for further details. FIG. 2 illustrates the encapsulation of data transmitted in a frame 36 between the ingress and egress gateways. The frame 36 consists of an IP header 38, a UDP header 40, and UDPX header 42 (described in further detail below and illustrated in FIG. 3), and a payload 44 consisting of one or more Internet Facsimile Packets (IFP) or Fax Data Packets (FDP), each comprising an IFP or FDP header 46 and a payload 48 comprising octets of facsimile data. The payload can be either in the form of a Internet Facsimile Packet or a Fax Data Packet. The structure of a Fax Data Packet is shown in FIG. 8 and will be described subsequently.

Upon successful completion of an end-to-end call establishment between the ingress and egress gateways, the H.323 protocol stack or layer in the ingress gateway 18 will send a link establish message to a lower layer in the ingress gateway 18 that implements the UDPX protocol stack and session as described herein. Upon starting this session, an ITU-T T30 CNG message is send from the sending fax machine 10 to the egress gateway 26. If the T0.30 CNG message is received from the sending fax machine 10, the ingress gateway 18 sends an empty UDPX frame (an information frame, described below, with a 0 length of data) as an indication of an incoming call. Upon establishment of a T.30 connection, the ingress gateway. transitions into a data transfer phase.

The egress gateway 26, upon receiving a link establish message from its higher H.323 layer, starts a UDPX error corrected session receiving a UDPX frame, from the ingress gateway 18. The egress gateway 26 transmits the received T.30 indicator from the receiving fax machine 34 (CED detected) to the ingress gateway. If the destination fax machine 34 does not have the CED tone facility it may directly start sending the DIS message. Upon establishment of a T.30 connection, the egress gateway 26 transitions to a data transfer phase.

Upon completion of the T.30 establishment phase, the UDPX control functions within the ingress and egress gateways exchange the received fax data from/to their respective PSTN interface module. The data transferred between the two peers 10 and 34 could be either fax image or control data. The two peers 10 and 34 exchange data in a controlled half-duplex mode. When the entire call is completed, a link disconnect message from the H.323 layer will be received by the UDPX module in the ingress and egress gateways. The ingress and egress gateways perform an appropriate clean-up procedure for orderly release of the UDPX error-corrected session, the details of which are not important.

Figure 3:
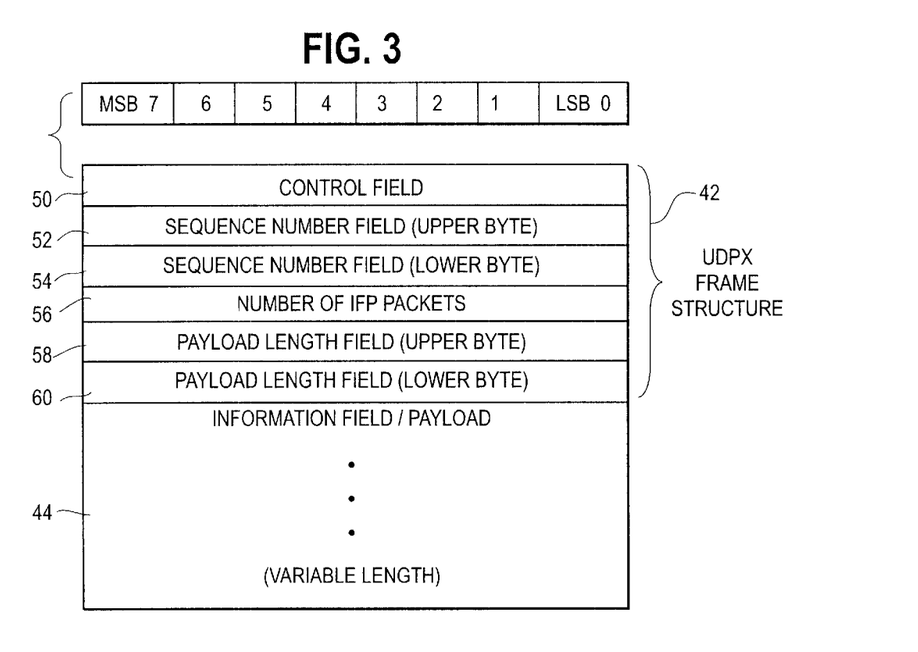
FIG. 3 is an illustration of the frame structure and fields of the facsimile protocol of a preferred embodiment of the present invention.

Referring now to FIG. 3, the operation of the UDPX control function for the UDPX protocol will be described. All gateway to gateway communication between the ingress and egress gateways 18 and 26 is accomplished using the frame structure shown illustrated in the figure. The UDPX frame consists of a collection of fixed length fields 50, 52, 54, 56, 58 and 60 comprising the UDPX header 42 of FIG. 2, plus an information field 44 of varying length, which contains the IFP/FDP header and the facsimile data payload. The information field 44 may contain a number of IFP/FDP facsimile data packets, as described in detail below.

Figure 4:
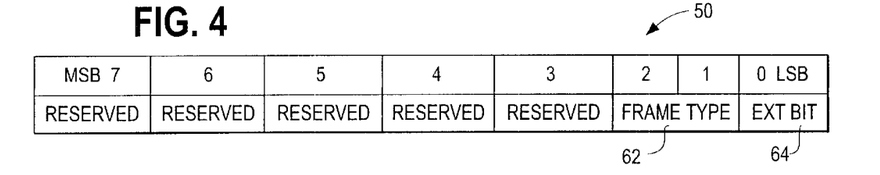
FIG. 4 is an illustration of the control field of FIG. 3.
Figure 5:
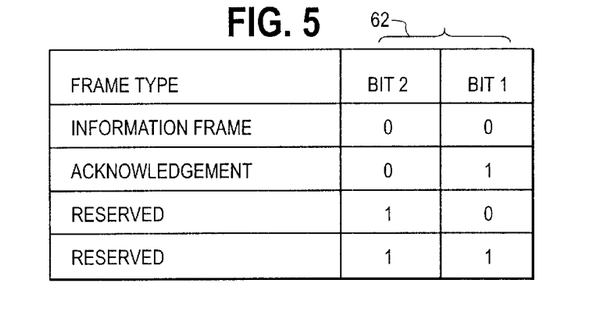
FIG. 5 is a table of the frame type encoding for the first two bit positions in the control field of FIGS. 3 and 4.

The UDPX frame includes a control field 50. This field 50 is used to distinguish between types of frames and header extensions. The field is shown in FIG. 4. The control field 50 consists of 8 bit positions. The least significant bit position (LSB) 64 in the control field is the extension bit, with a value of 1 in this bit indicates that an extension to the standard header is used. A 0 bit indicates that a standard header is used. The bit positions 1 and 2 of FIG. 4, reference numeral 62, are used to identify the type of frame being sent or received. The frame type encoding is shown in FIG. 5. Two types of frames are provided in the control field 50 of FIG. 4, namely an information frame, i.e., a frame containing facsimile data, and an acknowledgement frame, i.e., containing an acknowledgement that a frame was received, as indicated in FIG. 5.

Referring again to FIG. 3, the header 42 of the UDPX frame structure includes a sequence number field consisting of two bytes 52 and 54. The sequence number field contains the sequence number of the transmitted frame. At the time that an in-sequence frame is designated for transmission, the value of the sequence number for that frame is set to that of the Send State Variable (SSV), which is described further below.

The UDPX header 42 further includes a field 56 comprising a one byte long field that contains the number of IFP/PFD packets that are enclosed in this frame. The field can take any value between 0 and 255.

The UDPX header 42 further includes a field comprising bytes 58 and 60 and contains the length of the message/IFP/FDP packets. If more than one FDP or IFP packet is present in a UDPX frame, then this field 58 and 60 is replicated by that many number of packets.

Finally, the UDPX frame contains message field comprising the payload 44 which may contain an information field.

The software stack or module implementing the UDPX protocol described herein has at least five variables or parameters. They are the Send State Variable, an Acknowledge State Variable, a Receive State Variable, a flow control window (W), and a Redundant Packet Window (RPW).

The Send State Variable denotes the sequence number of the next frame to be transmitted. This variable can take on the value of 0 through 65535 in the illustrated embodiment where the frame sequence number is a 16 bit number. The value of this variable is incremented by 1 which each successive information frame transmission, and should not exceed the Acknowledge State Variable by more than the maximum number "W" of outstanding information frames. The value of W may be within the range of 1 to 65534.

The Acknowledge State Variable (ASV) identifies the last frame that has been acknowledged by its peer. The value of (ASV−1) equals the sequence number of the last acknowledged information frame. This variable can take on the value of 0 though 65535 in the illustrated embodiment.

The Receive State Variable (RSV) denotes the sequence number of the next in sequence information frame to be received by the egress gateway. The value of this variable is incremented by 1 every time an in-sequence frame is received successfully. The variable can take on the value of 0 through 65535 in the illustrated embodiment.

The sliding flow control window W governs the maximum number of information frames, as determined by the frame's sequence number, that an error correcting transmitter (e.g., ingress gateway 18) can have outstanding without receiving an acknowledgement from the receiver (e.g., egress gateway 26). The sliding flow control window will be explained in conjunction with FIGS. 11A–11C. For example, if the window size W is 16, that means that the transmitter can send 16 sequential frames to the receiver before it starts looking for an acknowledgement from the receiver. The window keeps sliding to higher packet sequence numbers as the transmitter keeps receiving acknowledgements from the receiver.

Figure 11A:
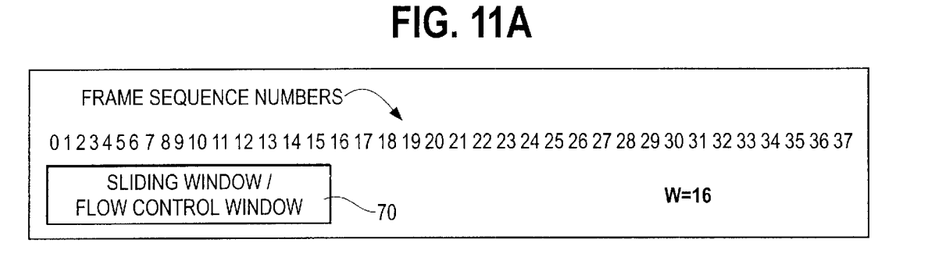
FIGS. 11A–11C illustrate one example of the operation of the sliding flow control window 70 of FIG. 6, where the window size W is equal to 16 and a total of 38 frames numbered from 0 to 37 are to be sent from a transmitter to a receiver across an IP network.

For example, assume that the information frame sequence number ranges from 0 to 65535. (These are the potential values of the SSV variable). Assume further that the window size W is 16. Assume further that the transmitter has a total of 38 frames to send to the receiver, numbered 0 to 37. In the beginning, the SSV is set to 0 and the ASV variable is also 0. Sixteen frames numbered 0 to 15 are placed in the flow control window, as shown in FIG. 11A. Since the window size is 16 the transmitter will send frames 0 to 15 before waiting for an acknowledgement. The sliding or flow control window is between 0 and 15. After sending these frames, the transmitter will wait for an acknowledgement for any frame between 0 and 15 and slide accordingly.

Figure 11B:
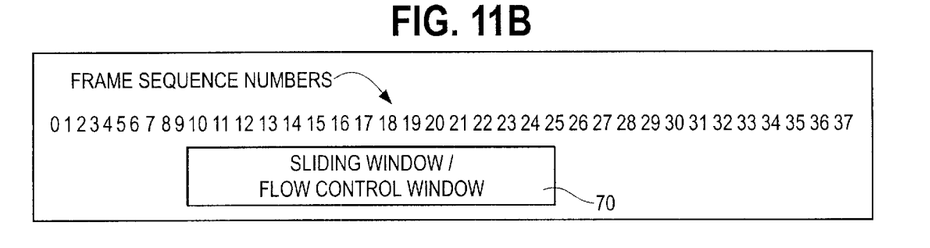
Figure 11C:
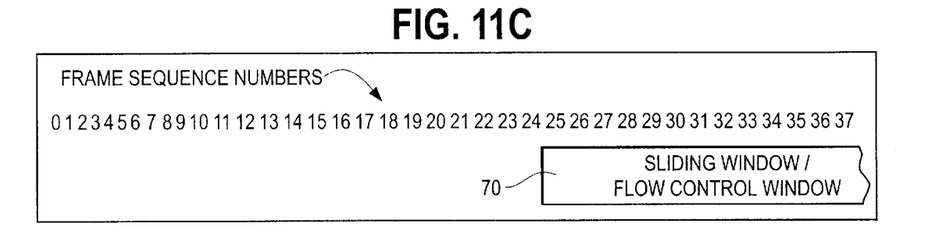

Assume that the receiver sends and acknowledgement that information frame with sequence number 10 has been received. That means that all frames with lower sequence numbers have been received correctly. The acknowledgment state variable (ASV) is set to 10. At this point, the flow control window slides to move to between 10 and 25, as shown in FIG. 11B. The transmitter will discard frames 0 to 9 and then sends frames 16 to 25 to the receiver, and then stop again. Note that the transmitter does not discard frames 10–15 since it has not received an acknowledgement for them. The size of the window W remains at 16 frames.

Now assume that the acknowledgement is received for frame number 25. The ASV is set to 25. The window slides from 25 to 40. See FIG. 11C. Frames 38, 39 and 40 do not exist, so the transmitter will send only the frames numbered 26–37.

The window size W can take any given value, from 1 to 65534 in the present example. Since sequence numbers range from 0 to 65535, W can be up to the maximum sequence number but not more, since the sequence number may not be unique for a given facsimile transmission. The window size W, i.e., how many frames could be in the transmitter buffer, is implementation dependent, and, like the other values for the variables, could vary within the scope of the invention.

The Redundant Packet Window size (RPW) indicates the number of redundant packets in each of the frames transmitted from the transmitter to the receiver across the IP network. This parameter is described in further detail below.

Figure 6:
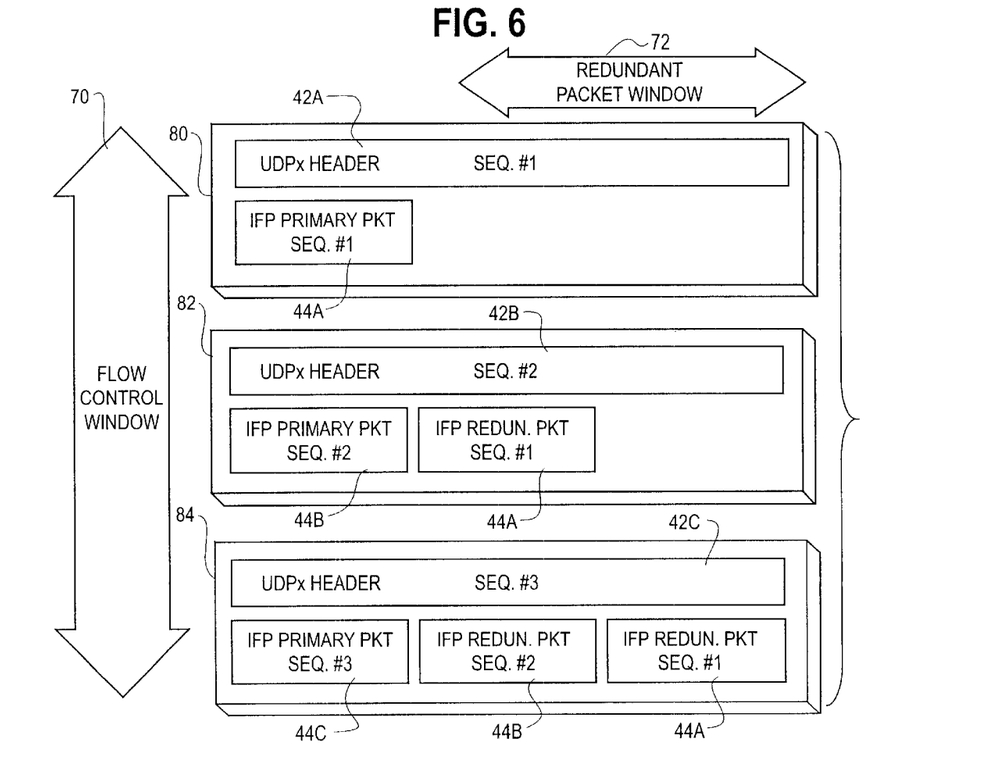
FIG. 6 is an illustration of the flow control and redundant packet windows for a series of frames, in which the two windows are used to perform error correction and maximize throughput and reliability for transmitting facsimile data across the IP network of FIG. 1.

With the above description in mind, the reader's attention is directed to FIG. 6, which is an illustration of the adaptive flow control and redundant packet windows for a series of frames, in which the two windows are used to perform error correction and maximize throughput and reliability across the IP network 22 of FIG. 1. Basically, the error correction functionality is achieved by using a scheme where all information frames exchanged over the UDP link are sequentially numbered and are transmitted within a maximum permissible window size. When the egress gateway receives the number information frames it keeps acknowledging the sequentially received information frames by transmitting an acknowledgement frame.

Two windows are implemented by the UDPX stack in the ingress gateway to attain the best throughput and reliability, namely the flow control window 70 and the dynamic redundant packet window 72. These two windows work in conjunction with the acknowledgement techniques described herein.

The flow control window 70 is a sliding window that determines the maximum information frame (determined by its sequence number) that a transmitter can send at any given time without waiting for an acknowledgement or ACK from the receiver. The transmitter will transmit the next in sequence information frame upon receipt of the ACK. For example, assume that the value of W is 16, and the first three frames with sequence numbers 1, 2 and 3 are received by the transmitter. Frames 1, 2 and 3 are transmitted to the receiver. When an ACK for the first three frames (1, 2 and 3) is received, then the window index W slides to 19 and the transmitter can send more frames (with sequence numbers between 4 and 19) if they are available.

The dynamic redundant packet window 72 dynamically alters the number of redundant IFP or FDP packets that can be transmitted in any given UDPX frame. The size of the window 72, RPW, is a parameter or index that is variable depending upon the quality of the network 22 and whether packets are lost en route from the transmitter to the receiver. If the network 22 does not loose packets the dynamic redundant window 72 size is reduced to one primary IFP/FDP packet per one information frame, and no redundant packets are transmitted in each frame. In FIG. 6, the information frame 80 consists of the UDPX header 42A with a sequence number of 1, and an IFP primary packet 44A also having a sequence number of 1. The IP and UDP headers for the information frame 80 are not shown in FIG. 6, but would be present as indicated in FIG. 2. Note that in FIG. 6 the frame 80 has no redundant packets, just the primary packet 44A.

If the network exhibits choppy behavior, such that packets are lost or corrupted in transit, then the size of the dynamic redundant packet window 72 increases. The transmitter plugs in some number of redundant IFP or FDP packets equal to the redundant packet window index RPW after the primary IFP or FDP packet, with the redundant packets having monotonically decreasing packet sequence numbers. In FIG. 6, this is illustrated in the second information frame 82. Information frame 82 contains a UDPX header 42B with a frame sequence number of 2, an IFP primary packet 44B with a packet sequence number of 2, and a redundant packet 44A, comprising the same packet 44A as in frame 80 (and presumably lost or corrupted in transit from the transmitter to the receiver when send in frame 80). In this example, the value of the RPW index is 1.

As another example, a third frame 84 is shown, comprising a UDPX header 42C with a frame sequence number of 3, an IFP primary packet 44C with a packet sequence number of 3, and two IFP redundant packets, comprising packets 44B and 44A (same as transmitted in the second frame 82) with monotonically decreasing sequence numbers. In this example, the value of the RPW index is 2.

The maximum number of IFP or FDP packets that can be plugged into an UDPX frame will be determined by the size of the dynamic redundancy window 72. The maximum size of the parameter RPW for the window 72 should be set such that it is one less than flow control window size, i.e. the maximum number of frames that the transmitter can hold. For example, if the size W of the flow control window 70 is three, window 70 can hold three frames and the maximum number of redundant packets that can be sent in any frame is two.

Figure 7:
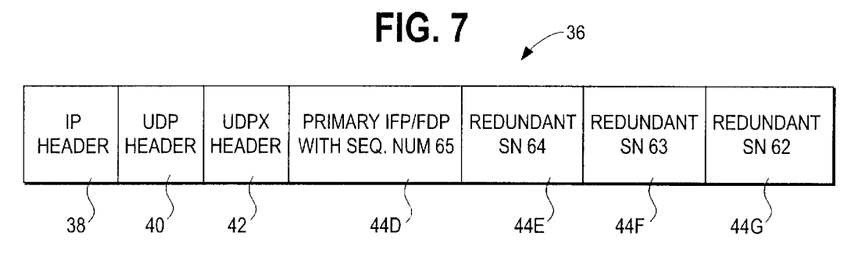
FIG. 7 is an illustration of the redundant packets contained in a single Information (I) frame.

The data transmitted from the transmitter to the receiver across the IP network is sent in the format of an Information frame or I frame. See FIGS. 2–5. When transmitting I frames, the transmitter may send either a single IFP or FDP packet per one I frame, or multiple packets per frame. See, for example, FIG. 6. See also the example of FIG. 7, in which the frame 36 contains a primary packet 44D with a sequence number of 65, and three redundant packets 44E, 44F and 44G having monotonically decreasing sequence numbers 64, 63 and 62, respectively. The transmitter sequentially numbers all I frames as per the value of the Send State Variable (SSV) referred to previously. After transmitting an I frame successfully, the SSV should be incremented by 1.

The transmitter transmits all I frames within a preselected window without waiting for an ACK from the receiver. The transmitter ceases I frame transmission once the SSV value equals the Acknowledge State Variable plus the value of W, as defined previously. The transmitter starts a retransmission timer upon transmitting the first I frame and retransmits the frame if an ACK is not received within the time period set by the timer.

Upon receiving the first I frame, the receiver (e.g. egress gateway 26 in FIG. 1) starts an acknowledgement timer. Upon receipt of a valid I frame whose sequence number is equal to that of the Acknowledge State Variable, the receiver passes the information field for this frame to the next higher layer in the protocol stack implemented in the receiver, increments the Acknowledge State Variable by 1, and sends an ACK for the received I frame every $W/4^{th}$ frame. If the receiver receives an out of sequence frame, the receiver analyzes the header of the out of sequence frame and looks to see if there are any redundant packets in the frame. If the missing packet is found, it should be processed immediately. The receiver should also send an ACK upon expiration of the acknowledgement timer.

As noted above, the egress gateway implements an acknowledgement timer. The acknowledgement timer governs the amount of time that a receiver waits to send an automatic acknowledgment. The value of this timer should be selected based on the characteristics of the network in use. The value is recommended to be 200 ms for the public Internet. The timer should be restarted upon transmission of an ACK frame.

The ingress gateway maintains a retransmission timer. This timer governs the amount of time that the transmitter waits to receive an ACK frame for all the outstanding frames sent to the receiver. Upon expiry of the timer, the transmitter shall transmit all outstanding I frames starting with the frame with a sequence number equal to the value of the ASV, in redundant form. The retransmission timer must be restarted upon expiry only if any I frames are outstanding. The value of this timer should be selected based on the characteristics of the network in use. In a preferred embodiment, its value is recommended to be about two and a half times that of the acknowledgement timer time, such as about 500 ms for the public Internet.

A parameter Retransmission Count (RC) governs the maximum number of times that an error correcting entity will retransmit an entire window of one or more outstanding frames. The value of RC should be selected based on the characteristics of the network in use. However, the total retransmission time should not exceed the maximum interline fill of 5 seconds, as described in the T.30 Recommendation. The retransmission count is recommended to be 8 for the Internet.

As noted previously, the UDPX protocol user has the option to use either the IFP or FDP packet formats as its payload. The IFP format is described in the ITU-T T.38 specification. The optional Fax Data Packet (FDP) format is illustrated in FIG. 8. This FDP packet 90 has an 8 bit header field 92 and a variable length payload field 94.

Figure 9:
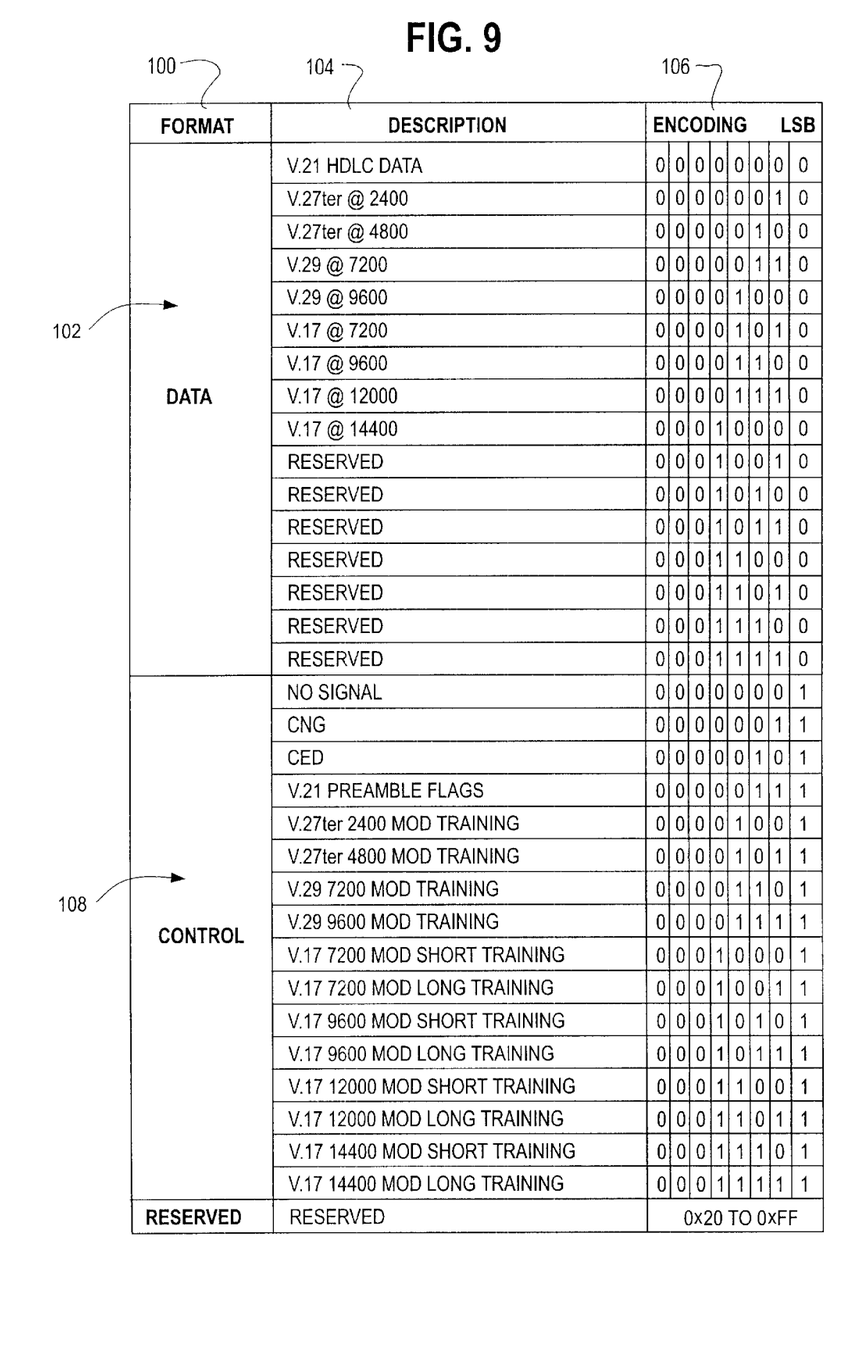
FIG. 9 is a table illustrating the encoding for header field of a fax data packet of FIG. 8.

The header field 92 determines what type of fax information the payload contains. There are two types of FDP packets: a T.30 control packet and a T.30 Data packet. The encoding of the control and the data packet of the FDP is shown in FIG. 9. At the top of the figure, the format column 100 indicates the type of packet, data or control. The column 104 is a description of the type of modulation or data, as the case may be, for fax signals over the PSTN that are contained in the FDP packet. The column 106 indicates the encoding in the header field 92 of FIG. 8 for the information in column 104.

The T.30 control packet type of the FDP packet indicates the type of fax signals and modulations being received on the PSTN end. The packet is only one byte long. The packet is recognized by the least significant bit position 95, which is always set to 1. As shown in the bottom half of FIG. 9, the available 8 bit control headers are indicated at 108, wherein the least significant bit position for each of the types of control signals is 1.

The data packet type of FDP packet carries T.30 image data. This type of packet is recognized by the header 92 of FIG. 8, in which the least significant bit position is always equal to 0. The types of data are shown in the top portion of FIG. 9 opposite reference numeral 102. The facsimile image transmission as described in the ITU-T T.3 specification can be done using different modulation techniques. The fax data packet carries this information in the header field as indicated in FIG. 9, along with the image data in the payload field 94 of FIG. 8.

A single data packet can contain single, multiple or partial scan lines. When sending multiple scan line within a data packet, it is recommended that the data packet be filled with scan line boundaries, although this is not absolutely necessary. The inclusion of scan line boundaries can reduce fragmentation and de-fragmentation problems.

Figure 10:
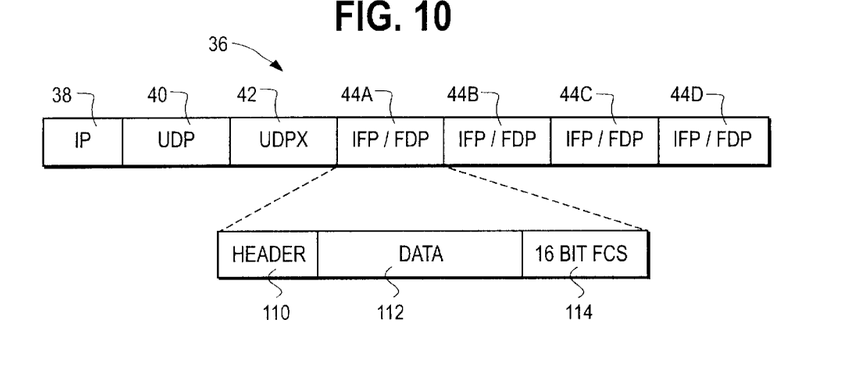
FIG. 10 is a illustration of a series of Internet Facsimile Protocol (IFP) or Facsimile Data Protocol packets within an I frame, in which each of the IFP or FDP packets contains a 16-bit frame check sequence at the tail end of the packet.

Additionally, as an additional error correction feature, the user has the option of using the check sum feature built into the UDP protocol. However, it is possible to use a separate 16 bit frame check sequence at every IFP/FDP packet within an information frame. This is shown in FIG. 10. The frame 36 contains four fax data packets 44A, 44B, 44C and 44D. Each of the packets 44A, 44B, 44C, 44D, is of the same format, a header 110, a data or payload field 112 and a 16 bit frame check sequence 114 at the end of each packet. If the frame check sequence feature of FIG. 10 is implemented, the UDP check sum is turned off in the transmitter and receiver. The advantage of using the frame check sequence on every packet as indicated in FIG. 10 is that if only one IFP/FDP packet takes a hit or is lost in the network, then with the exception of that packet the rest of the frame will be useful and can be processed by the receiving gateway.

From the above description, and with reference to FIGS. 1 and 6, it will be appreciated that we have described a method of transmitting facsimile data across a packet-switched network 22 from a transmitter 18 to a receiver 26, comprising the steps of: implementing a sliding flow control window 70 that controls the maximum outstanding frames 80, 81, 82 that the transmitter may transmit at any given time to the receiver without waiting for an acknowledgement from the receiver 26; implementing a dynamic redundancy window 72 that controls the number of redundant packets 44 that are retransmitted from the transmitter 18 to the receiver 26; and dynamically increasing or decreasing the size of the dynamic redundancy window 72 depending on whether the network 22 exhibits a tendency to lose or corrupt packets transmitted across the network 22 between the transmitter 18 and the receiver 26.

Each of the redundant packets 44 contained in the dynamic redundancy window 72 have a sequence number (as shown in FIG. 6, see frame 84, packets 44B and 44A), and wherein the redundant packets have monotonically decreasing sequence numbers. See also the example of FIG. 7.

As indicated above, the packets may have the structure of an Internet Facsimile Packet as set forth in the ITU-T T.30 recommendation, or the packet may comprises a Fax Data Packet having the structure shown in FIG. 8.

As another possible embodiment, the frame 36 may comprises a plurality of packets containing facsimile data, and wherein each of the packets comprises a header, a data field, and a 16 bit frame check sequences at the end of each packet as indicated in FIG. 10.

It will also be appreciated that we have described an improvement to a transmitter or gateway for Internet Protocol (IP) facsimile, e.g., ingress gateway 18. The transmitter has an interface to a public switched telephone network 14, with the interface receiving facsimile data from a fax machine 10 connected to the public switched telephone network 14. The ingress gateway further has an interface to an IP packet switched network 22. The improvement comprises a transmission module (e.g., a software program or stack implementing the UDPX protocol as described herein) that controls the transmission of facsimile data onto the IP network 22 for receipt by a receiver for the facsimile data, i.e., egress gateway 26.

The transmission module implements a sliding flow control window 70 that controls the maximum outstanding frames that said transmitter may transmit at any given time without waiting for an acknowledgement from the receiver. The transmission module further implements a dynamic redundancy window 72 that controls the number of redundant packets that are retransmitted from the transmitter to the receiver. Further, the transmission module dynamically increases or decreasing the size of the dynamic redundancy window 72 depending on whether the network 22 exhibits a tendency to lose packets transmitted between the transmitter and the receiver. The choppy nature of the network, if present, will be apparent from the order and timing of the ACK frames and the Acknowledge State Variable.

Additionally, an error control method for facsimile data is described herein. The method comprises the steps of forming an information frame of facsimile data as indicated in FIG. 10. The frame has an IP header, a UDP header, a UDPX header, and a plurality of packets containing facsimile data. The method further comprises the step of placing a 16 bit frame check sequence number at the end of every packet in the plurality of packets. The frame is then placed on the packet switched network for transmission from a transmitter or ingress gateway to a receiver or egress gateway.

Persons of skill in the art will appreciate the various modifications and alterations to the preferred techniques and methods disclosed herein can be made without departure from the, scope and spirit of the invention. This true scope and spirit is defined by the appended claims, interpreted in light of the foregoing specification.

We claim:

1. A method of transmitting a frame of facsimile data across a packet switched network from a transmitter to a receiver, comprising the steps of:

implementing a sliding flow control window that controls the maximum outstanding frames that said transmitter may transmit at any given time to said receiver without waiting for an acknowledgement from said receiver, each of said frames containing one or more facsimile data packets;

implementing a dynamic redundancy window that controls the number of redundant facsimile data packets that are retransmitted from said transmitter to said receiver within said frames; and dynamically increasing or decreasing the size of said dynamic redundancy window depending on whether said network exhibits a change in a tendency to lose packets transmitted across said network between said transmitter and said receiver, the size of said dynamic redundancy window decreasing when said network tends to lose less packets and increasing when said network tends to lose more packets.

2. The method of claim 1, wherein said dynamic redundancy window has a size of RPW, and wherein said flow control window has a size of W, and wherein RPW comprises an integer greater than or equal to zero, indicting the number of redundant packets transmitted from said transmitter to said receiver, and wherein RPW is less than W.

3. The method of claim 2, wherein the maximum value for RPW is W–1.

4. The method of claim 1, wherein each of said redundant packets contained in said dynamic redundancy window have a sequence number, and wherein said redundant packets comprise packets with monotonically decreasing sequence numbers.

5. The method of claim 1, wherein said facsimile data packet comprises a Fax Data Packet having the structure shown in FIG. 8.

6. The method of claim 1, wherein each of said facsimile data packets within said frame comprises a header, a data field, and a 16 bit frame check sequence at the end of each packet.

7. In a transmitter for Internet Protocol (IP) facsimile, said transmitter having an interface to a telephone network, said interface receiving facsimile data from a source of facsimile data connected to said telephone network, and an interface to an IP packet switched network, the improvement comprising:

a transmission module controlling the transmission of facsimile data in a frame onto said IP network for receipt by a receiver for said facsimile data;

wherein said transmission module implements a sliding flow control window that controls the maximum outstanding frames that said transmitter may transmit at any given time without waiting for an acknowledgement from said receiver;

and wherein said transmission module implements a dynamic redundancy window that controls the number of redundant packets that are retransmitted from said transmitter to said receiver in said frames;

and wherein said transmission module dynamically increases or decreases the size of said dynamic redundancy window depending on whether said network exhibits a change in a tendency to lose packets transmitted between said transmitter and said receiver, the size of said dynamic redundancy window decreasing when said network tends to lose less packets and increasing when said network tends to lose more packets.

8. The improvement of claim 7, wherein said dynamic redundancy window has a size of RPW, and wherein said flow control window has a size of W, and wherein RPW comprises an integer greater than or equal to zero, indicting the number of redundant packets transmitted from said transmitter to said receiver, and wherein RPW is less than W.

9. The improvement of claim 8, wherein the maximum value for RPW is W−1.

10. The improvement of claim 7, wherein each of said redundant packets contained in said dynamic redundancy window have a sequence number, and wherein said redundant packets comprise packets with monotonically decreasing sequence numbers.

11. The improvement of claim 7, wherein said packet comprises a Fax Data Packet having the structure shown in FIG. 8.

12. The improvement of claim 7, wherein said frame comprises a plurality of packets containing facsimile data, and wherein each of said packets comprises a header, a data field, and a 16 bit frame check sequence at the end of each packet.

* * * * *